United States Patent
Nichol et al.

(10) Patent No.: US 12,141,539 B1
(45) Date of Patent: Nov. 12, 2024

(54) COMPUTING PROCESS FLOW CONTROL VIA DETERMINATION OF DIALOGUE CONTEXT BETWEEN A USER AND AN ARTIFICIAL INTELLIGENCE ASSISTANT

(71) Applicant: Rasa Technologies Inc., San Francisco, CA (US)

(72) Inventors: Alan Nichol, Berlin (DE); Tom Bocklisch, Potsdam (DE); Thomas Werkmeister, Potsdam (DE)

(73) Assignee: Rasa Technologies Inc., San Francisco, CA (US)

( * ) Notice: Subject to any disclaimer, the term of this patent is extended or adjusted under 35 U.S.C. 154(b) by 0 days.

(21) Appl. No.: 18/663,884

(22) Filed: May 14, 2024

(51) Int. Cl.
*G06F 40/35* (2020.01)

(52) U.S. Cl.
CPC ................... *G06F 40/35* (2020.01)

(58) Field of Classification Search
CPC ...................................................... G06F 40/35
See application file for complete search history.

(56) References Cited

U.S. PATENT DOCUMENTS

| | | | |
|---|---|---|---|
| 11,626,105 B1* | 4/2023 | Gabardo | G10L 15/063 704/257 |
| 2018/0097940 A1* | 4/2018 | Beilis | H04M 3/5235 |
| 2020/0128053 A1* | 4/2020 | Rosanuru | G06Q 20/407 |
| 2022/0100464 A1* | 3/2022 | Prakash | G06F 1/329 |
| 2023/0244989 A1* | 8/2023 | Riva | G06N 3/045 706/11 |
| 2024/0185002 A1* | 6/2024 | Atlan | G06N 20/00 |

* cited by examiner

*Primary Examiner* — Eric Yen
(74) *Attorney, Agent, or Firm* — Cognition IP, P.C.; Edward Steakley

(57) ABSTRACT

Methods, systems, and apparatus, including computer programs encoded on computer storage media for computing process flow control via determination of dialogue context between a user and an artificial intelligence assistant. Multiple defined computing process flows are received by the system. Each of the defined computing process flows describe one or more instructions to be performed. Information about the defined computing process flows and dialogue between the user and the artificial intelligence assistant are provided as a prompt to a large language model (LLM). The system receives from the LLM one or more selected commands for a defined computing process flow relating to the context of the received input from the user. The system performs the command as to the computing process flow.

20 Claims, 7 Drawing Sheets

300

150

COMPUTING PROCESS FLOW CONTROL VIA DETERMINATION OF DIALOGUE CONTEXT BETWEEN A USER AND AN ARTIFICIAL INTELLIGENCE ASSISTANT

CROSS-REFERENCE TO RELATED APPLICATIONS

None.

FIELD

This application relates generally to configuring automating artificial intelligence systems, and more particularly to systems and methods for computing process flow control via determination of dialogue context between a user and an artificial intelligence assistant.

SUMMARY

Systems and methods described herein provide for task-oriented dialogue with in-context learning. The system and methods provide for receiving multiple defined computing process flows. Each of the defined computing process flows describe one or more instructions to be performed. Each defined computing process flow includes a computing process flow description uniquely describing the flow. The system provides as a prompt to a large language model (LLM) at least a respective name and description for each of the multiple defined computing process flows. The system uses an AI assistant to engage in a dialogue with a user. The user may provide input, such as entering input into a user interface, questions, queries, touch inputs, mouse inputs or other statements or information. The system provides as a prompt to the LLM at least a portion of the received input received from the user. The system receives from the LLM one or more commands for performing operations related to a selected defined computing process flows that relate to the context of the received input from the user. The system performs processing related to the selected one or more defined computing process flows. For brevity, the defined computing process flow is often referred to as flow.

In some embodiments, the system provides functionality for three processes: a computing process flow definition and selection process, a dialogue understanding process and an automatic conversation repair process.

In some embodiments, the system initializes and performs a set of defined computing process flows. A defined computing process flow describes a series of computation instructions or code to be initiated by an Artificial Intelligence (AI) assistant based on a conversational dialogue with a user. The computing process flow describes the information needed from a user, and any data needed for retrieval from an API or a database, and/or any branching logic based on the information collected. A computing process flow describes the logic that the AI system will follow or perform, but the defined flow does not describe all the possible conversation paths by the user with the AI assistant.

In some embodiments, the system implements the dialogue understanding process to interpret (i.e., evaluate) what end users are communicating to the AI assistant. The system generates commands that reflect the user's intentions, aligned with the predefined computational logic and the context of the ongoing conversation. The system provides commands for starting and stopping one or more flows, for filling slots, and other functionality. Commands are instructions that the system uses to navigate or manage conversations and/or flows between an AI assistant and a user.

In some embodiments, the system implements an automatic conversation repair process which handles various ways that a conversation with the AI assistant may go "off script". In some embodiments, the system uses a process of dialogue understanding (DU) that translates what users are saying into what that means for predefined computational logic. This process differs from a traditional natural language understanding (NLU) approaches in three ways: (1) While NLU interprets one message in isolation, DU considers the greater context: the back-and-forth of the conversation and the AI assistant's computational logic. (2) Instead of producing intents and entities like NLU systems, DU outputs a sequence of commands representing how users want to progress the conversation. (3) NLU systems are restricted to a fixed list of intents, whereas the DU process is generative and produces a sequence of commands according to proscribed grammar. This construct provides a rich language to represent what a user wants.

In some embodiments, the system uses a trained large language model (LLM) to determine how the user wants to progress the conversation. The system uses the LLM to understand the user side of a conversation. The LLM output is a short set of fixed commands, eliminating the risk of hallucination along with reducing latency and token generation cost. The system may be configured to use a custom LLM or an online or Internet-based LLM service that may receive input, such an OpenAI and ChatGPT.

The system provides many benefits, such as: the implementation of computational logic for a finite set of skills/user goals; implementation of computational logic that needs to be strictly enforced; limiting the actions that end users may perform via the system.

Over the course of a session of dialogue between a user and the AI assistant, multiple computing process flows may be identified to be performed based on the dialogue context with the user.

The appended claims may serve as a summary of this application.

DETAILED DESCRIPTION OF THE DRAWINGS

Figure 1A:
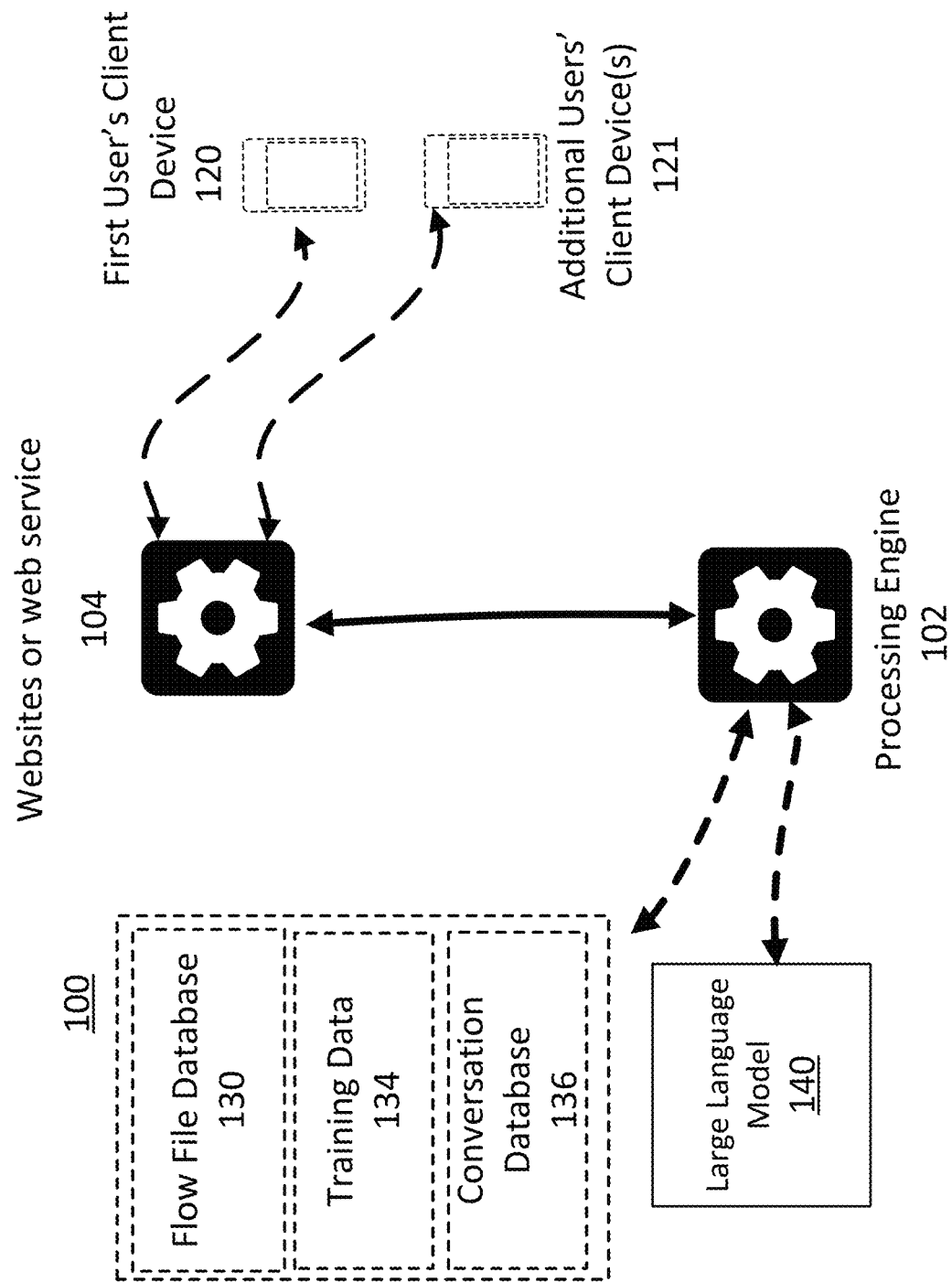
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and their equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

FIG. 1A is a diagram illustrating an exemplary environment in which some embodiments may operate. In the exemplary environment 100, a first user's client device 120 and one or more additional users' client device(s) 121 are connected to a processing engine 102. The client devices 120, 121 may interact with one or more websites (e.g., web services) running a code or a service for interaction with the processing engine 102. For example, a client device may access a first website or web service which may receive inputs form a user. These inputs may be provided directly or indirectly to the processing engine 102.

The processing engine 102 is connected to one or more machine learning models 140 (e.g., large language model) and is connected to one or more repositories (e.g., non-transitory data storage) and/or databases, including a flow file database 130 for storing computing process flow related files or definitions, and a training database 134 that includes training data to train one or more machine learning models, and a conversation database 136 that stores conversations data with between the AI assistant and user. One or more of the databases may be combined or split into multiple databases. The first user's client device 120 and additional users' client device(s) 121 in this environment may be computers, mobile devices, which are communicatively coupled to one or more servers operating the processing engine.

In an embodiment, processing engine 102 may perform the methods 300, 400, 500 or other methods herein and, as a result, provide interactive user interfaces used to receive user input and construct prompts for input into one or more machine learning models.

In some embodiments, the client devices 120, 121 interact directly with other online or web-based services 104. The system 100 can generate output and provide the generated output directly to the online or web-based services 104 and/or in some embodiments directly to the client devices 120, 121.

The first user's client device 120 and additional users' client device(s) 121 may be devices with a display configured to present information to a user of the device. In some embodiments, the first user's client device 120 and additional users' client device(s) 121 present information in the form of a user interface (UI) with UI elements or components. In some embodiments, the first user's client device 120 and additional users' client device(s) 121 send and receive signals and/or information to the processing engine 102.

In some embodiments, the first user's client device 120 and additional users' client device(s) 121 are computing devices capable of hosting and executing one or more applications or other programs capable of sending and/or receiving information. In some embodiments, the first user's client device 120 and/or additional users' client device(s) 121 may be a computer desktop or laptop, mobile phone, video phone, conferencing system, or any other suitable computing device capable of sending and receiving information.

Figure 1B:
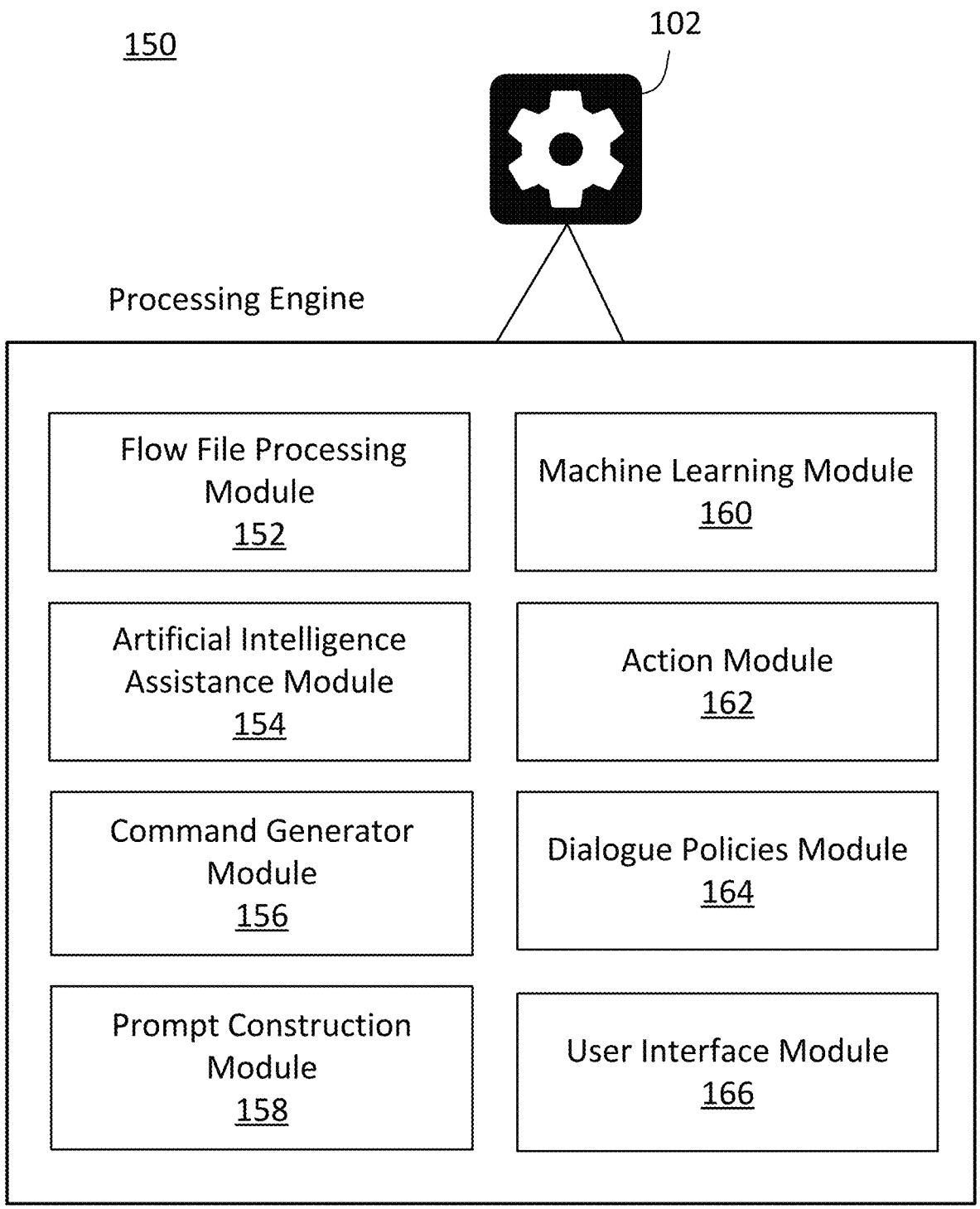
FIG. 1B is a diagram illustrating an exemplary computer system with software and/or hardware modules that may execute some of the functionality described herein.

FIG. 1B is a diagram illustrating an exemplary computer system 150 with software and/or hardware modules that may execute some of the functionality described herein. Computer system 150 may comprise, for example, a server or client device or a combination of server and client devices for automated configuration of software systems using images of hardware components or peripherals. The exemplary computer system 150 is shown with the processing engine 102 performing multiple modules: Flow File Processing Module 152, Artificial Intelligence Assistance Module 154, Command Generator Module 156, Prompt Construction Module 158, Machine Learning Module 160, Action Module 162, Dialogue Module 164, and User Interface Module 166.

The Flow File Processing Module 152 provides system functionality for the handling, management, processing and/or storage and retrieval of files related to definition of the computing process flows.

The Artificial Intelligence Assistance Module 154 provides system functionality for operations of an AI assistant that interacts with a user. The AI assistant performs operations and generates dialogue according to a computing process flow being performed by the system.

The Command Generator Module 156 provides system functionality for the generation of commands based on context of dialogue between a user and the AI assistant. For example, the Command Generator Module may interact with an external large language model and/or a private large language model to generate commands based on a context of dialogue with a user. The Command Generator Module 156 may interact directly with an LLM 140.

The Prompt Construction Module 158 provides system functionality for the construction and formatting of prompts that are input into an LLM 140. The Prompt Construction Module 156 generates textual prompts for input to the LLM 140.

The Machine Learning Module 160 provides system functionality for the training of a machine learning network based on data and performs machine learning model tuned based on the tracked signals. The machine learning network may be trained to generate textual output in response to one or more constructed prompts using data received via one or more user interfaces.

The Action Module 162 provides system functionality for the performance of actions associated with a computing process flow. An action, for example, may be a program written in a programming language (such as Python) that is to be performed by a computing process flow.

The Dialogue Policies Module 164 provides system functionality for the generation of dialogue, such as text to be provided to a user during a conversation with a user. In some embodiments, text may be obtained from the large language model and/or from predefined scripts or strings in a defined computing process flow.

The User Interface Module 166 provides system functionality for presenting a user interface to the client devices 120, 121. Generated user interface may receive and process user input from users. User inputs received by the user interface herein may include clicks, keyboard inputs, touch inputs, taps, swipes, gestures, voice commands, activation of interface controls, and other user inputs.

Figure 2:
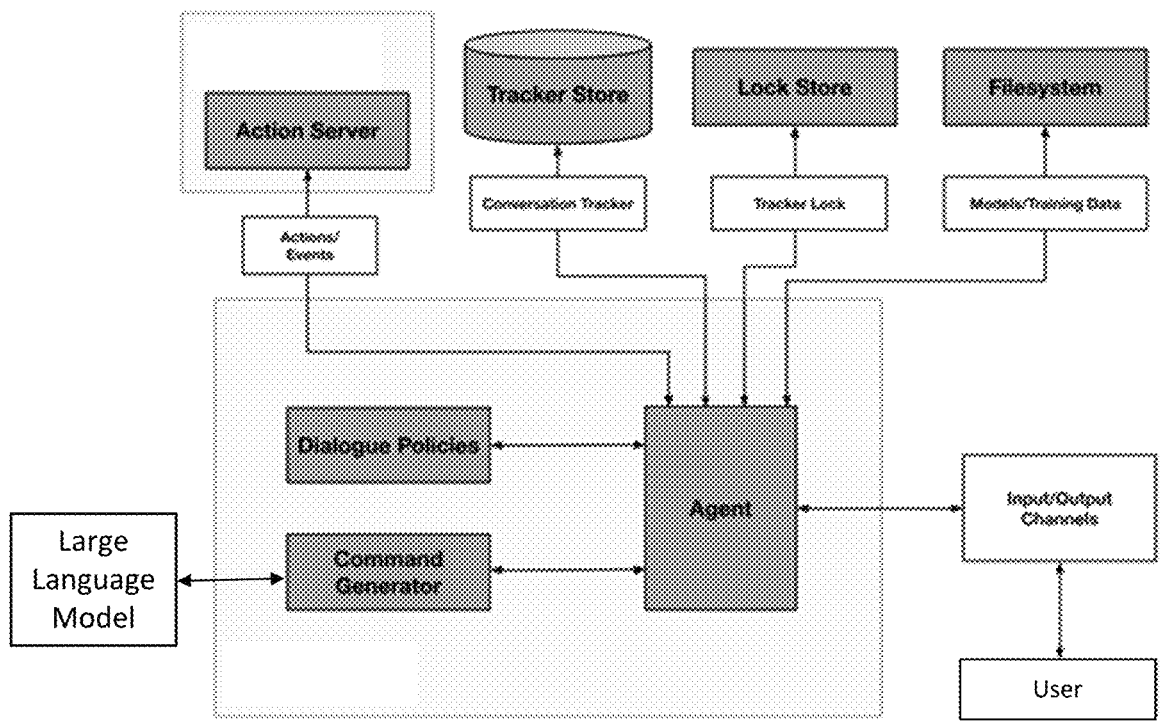
FIG. 2 is a diagram illustrating an embodiment of the exemplary computer system of FIG. 1B.

FIG. 2 is a diagram illustrating an embodiment of the exemplary computer system of FIG. 1B. The figure illustrates an architecture of the system with a user interacting with an AI assistant (e.g., the Agent). The AI assistant interacts with different services and servers, such as the Command Generator Module, a Dialogue Policies Module, an Action Server, a Tracker Store which stores conversational data with a user, a Lock Store and a file system storing data and machine learning models.

In some embodiments, the system uses a ticket lock mechanism to process incoming messages for a given conversation ID in the correct order, and locks conversations while messages are actively processed. This allows the system to use multiple servers that run in parallel as replicated services. Client devices do not necessarily need to address the same node when sending messages for a given conversation ID.

Computing Process Flows

The system uses defined computing process flows to implement particular computational logic that is handled by the AI assistant. The system uses the defined flows as a structured process to provide conversation-driven computational logic (e.g., computer code and/or computational instructions) with a user.

In some embodiments, the computational logic of an AI assistant is implemented as a set of flows. Each flow describes the logical steps an AI assistant uses to complete a task. For example, a computing process flow describes the information the system needs to obtain from the user, and the data needed to retrieve from an API or a database, and/or branching logic based on the information collected.

A computing process flow describes the logic that the AI assistant may follow, but the flow does not define all the potential conversational paths that can be taken with a user. A computing process flow allows computational logic to be explicitly described and followed with interaction via a dialogue with a user. The flow can validate the information that a user provides via a slot value as the conversation progresses. The system prevents users from using prompt injection to override predefined computational logic.

The following description provides an example of defining a computing process flow for implementation by the system. An example flow for money transfer is described. The example handles the interaction by the AI assistant with a user for the computational logic related to an exemplary flow for a money transfer.

Example of Defining a Computing Process Flow

The system may use one or more files and/or a database to describe a computing process flow. In the example, a file flows.yml contains the definition of a computing process flow called transfer_money. The transfer_money flow is defined as:

```
flows.yml
flows:
  transfer_money:
    description: This flow lets users send money to
      friends and family.
    steps:
      collect: recipient
      collect: amount
      description: the number of US dollars to send
      action: utter_transfer_complete
```

The two key attributes of the transfer_money flow are the description and the steps. A description is used to help decide when to activate this flow. The description is also helpful for anyone who inspects the code to understand the flow logic. If a user inputs dialogue, such as "I need to transfer some money", the system evaluates the input dialogue and determines that, based on the description, that this flow would be the relevant flow to use. The steps describe the computational logic required to do what the user asked for.

The first step in the flow is a collect step, which is used to fill a slot. A collect step sends a message to the user requesting information and waits for an answer to be input by the user. Slots are variables that the AI assistant can read and write throughout a conversation. Slots are defined in a domain.yml file. For example, the definition of the recipient slot may be described as:

```
domain.yml
slots:
  recipient:
    type: text
# . . .
```

A domain defines the environment in which an AI Assistant operates. The domain identifies responses that can be used as templated messages to send to a user; custom actions that can be predicted by dialogue policies; slots that act as the AI assistant's memory throughout a conversation; and session configuration parameters including inactivity timeout.

Responses are templated messages that the AI assistant can send to the user. Responses may include rich content like buttons, images, and custom json payloads. Every response also may be an action, meaning that it can be used directly in an action step in a flow. Responses can be defined directly in the domain file under the responses key.

Slots act as the AI assistant's memory. Slots act as a key-value store which can be used to store information provided by the user during a conversation with the AI assistant. Slots can be used to store information that users provide during a conversation with the AI assistant, or information that has been fetched via an API call. The example describes how to store information provided by the end user into a slot. To do this, a collect step is defined similar to the first step in the flow above.

```
flows.yml
flows:
  transfer_money:
    description: This flow lets users send money to
      friends and family.
    steps:
      collect: recipient
      collect: amount
      description: the number of US dollars to send
      action: utter_transfer_complete
domain.yml
responses:
  utter_ask_recipient:
    text: "Who would you like to send money to?"
```

The system will look for a response called utter_ask_recipient in the domain file and use this to phrase the question to the user. After sending this message via the AI assistant to the user, the system waits for a response from the user. When the user responds, the system will try to use the user's answer to fill the slot recipient.

Figure 3:
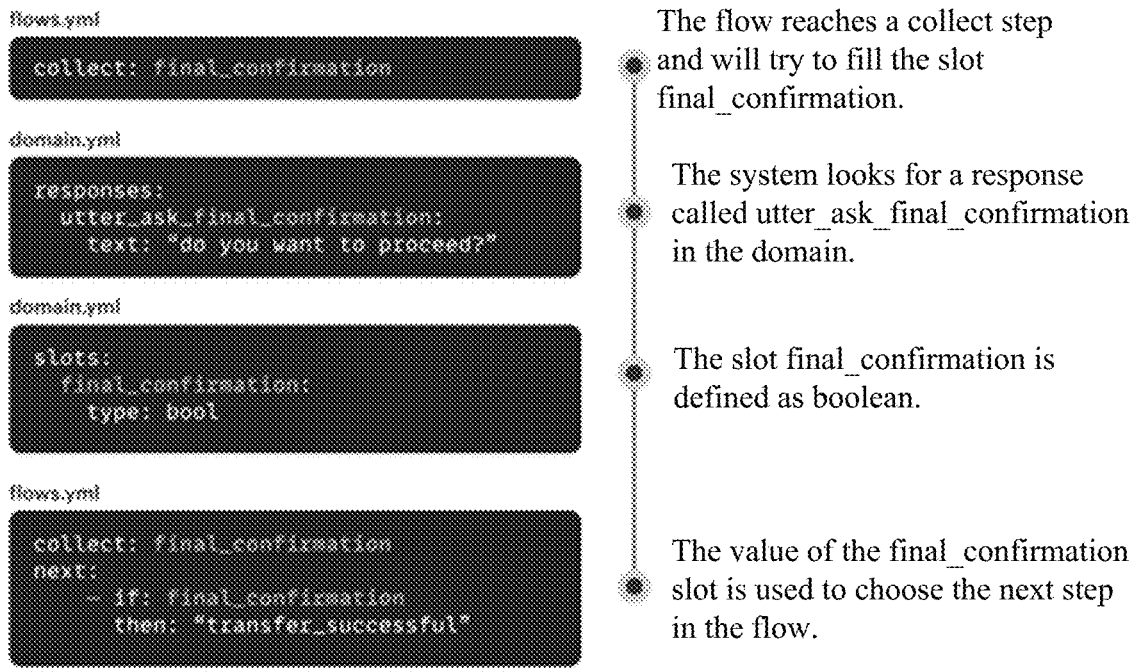
FIG. 3 is a process flow chart 300 illustrating an exemplary method that may be performed in some embodiments.

Referring to FIG. 3, the figure summarizes how slot values are used to collect and store information, and how they can be used to create branching logic.

The second collect step includes a description of the information the AI assistant will request from the user. Descriptions are optional but can help the system extract slot values more reliably.

The third step in the transfer_money flow is not a collect step but an action step. When the processing reaches an action step in a computing process flow, the AI assistant will execute the corresponding action and then proceed to the next step. The system will not stop to wait for the user's next message. For now, this is the final step in the flow, so there is no next step to execute, and the flow completes.

Slots may be used to build branching logic in flows. The example flow definition is further described and introduces an extra step in the flow, asking the user to confirm the amount and the recipient before sending the transfer. Since the flow is asking a yes/no question, the slot can store the result in a boolean slot which will call final_confirmation.

In the domain file, the definition of the final_confirmation slot and the corresponding response: utter_ask_final_confirmation is added. Also, a response to confirm the transfer has been cancelled had been added.

```
domain.yml
slots:
  recipient:
    type: Text
  # . . .
  final_confirmation:
    type: bool
domain.yml
responses:
  utter_ask_recipient:
    text: "Who would you like to send money to?"
  # . . .
  utter_ask_final_confirmation:
    text: "Please confirm: you want to transfer {amount}
      to {recipient}?" utter_transfer_cancelled:
    text: "Your transfer has been cancelled."
```

A syntax for confirmation question may be curly brackets { } to include slot values in the response.

A collect step is added to the flow for the slot final_confirmation. This step includes a next attribute with branching logic. The expression after the if key will be evaluated by the system to true or false to determine the next step in the flow. The then and else keys can contain either a list of steps or the id of a step to jump to. In this case, the then key contains an action step to inform the user their transfer was cancelled. The else key contains the id transfer_successful which has been added to the flow.

```
flows.yml
flows:
  transfer_money:
    description: This flow lets users send money to
      friends and family.
    steps:
      collect: recipient
      collect: amount
      description: the number of US dollars to send
      collect: final_confirmation
      next:
        if: not slots.final_confirmation
        then:
          action: utter_transfer_cancelled
          next: END
        else: transfer_successful
      action: utter_transfer_complete
      id: transfer_successful
```

In some embodiments, an action step in a computing process flow can describe two types of actions. If the name of the action starts with utter_, then this action sends a message to the user. The name of the action should match the name of one of the responses defined in the domain. The final step in the flow contains the action utter_transfer_complete, and this response is also defined in the domain. Responses can contain buttons, images, and custom payloads.

The second type of action is a custom action. The name of a custom action starts with action_. The example uses a custom action, action_check_sufficient_funds, to check whether the user has enough money to make the transfer, and then add logic to the flow to handle both cases. The custom action is defined in the file actions.py. For example, the custom actions may be code defined in a programming language such as python. The example actions.py file is defined as:

```
actions.py
from typing import Any, Text, Dict, List
from rasa_sdk import Action, Tracker
from rasa_sdk.executor import CollectingDispatcher
from rasa_sdk.events import SlotSet
class ActionCheckSufficientFunds(Action):
  def name(self)->Text:
    return "action_check_sufficient_funds"
  def run(self, dispatcher: CollectingDispatcher,
    tracker: Tracker,
    domain: Dict [Text, Any])->List [Dict [Text, Any]]:
    #hard-coded balance for tutorial purposes. in pro-
      duction this
    #would be retrieved from a database or an API
    balance=1000
    transfer_amount=tracker.get_slot("amount")
    has_sufficient_funds=transfer_amount<=balance
    return [SlotSet("has_sufficient_funds", has_suffi-
      cient_funds)]
```

Slots are the primary way to pass information to and from custom actions. In the run( ) method above, the code may access the value of the amount slot that was set during the conversation, and can pass information back to the conversation by returning a SlotSet event to update the has_sufficient_funds slot.

The example will describe three additions to the domain.yml: a top-level section listing I is added to custom actions; a new boolean slot has_sufficient_funds is added; and new response is added to send to the user in case they do not have sufficient funds.

```
domain.yml
actions:
  action_check_sufficient_funds
slots:
  # . . .
  has_sufficient_funds:
    type: bool
    mappings:
      type: custom
responses:
  # . . .
  utter_insufficient_funds:
    text: "You do not have enough funds to make this
      transaction."
```

The example flow logic is updated to handle the cases where the user does or does not have enough money in their account to make the transfer. The collect: final_confirmation step now also has an id so that branching logic can jump to it.

```
flows.yml
flows:
  transfer_money:
    description: This flow lets users send money to
      friends and family.
    steps:
      collect: recipient
      collect: amount
        description: the number of US dollars to send
      action: action_check_sufficient_funds
      next:
        if: not slots.has_sufficient_funds
        then:
          action: utter_insufficient_funds
          next: END
        else: final_confirmation
      collect: final_confirmation
      id: final_confirmation
      next:
        if: not slots.final_confirmation
        then:
          action: utter_transfer_cancelled
          next: END
        else: transfer_successful
      action: utter_transfer_complete
      id: transfer_successful
```

Validating Slot Values

In some embodiments, the system provides for the validation of slot values. The system provides different ways to validate slot values returned after a collect step in a computing process flow. Simple validations can be defined in the flow step itself, while validations requiring external data may be performed by a custom action.

The following description provides examples of how to validate slot values. In one example, a phone number may be validated. Assume in the example, that AI assistant has a computing process flow allowing users to change the phone number associated with their account. Note that the description field of the collect step already provides information to the Command Generator about the desired format.

```
flows.yml
flows:
  update_number:
    description: allows users to update the phone
      number associated with their account.
    steps:
      collect: phone_number
        description: 'an entire US phone number,
          including the area code.
          For example: (415) 555-1234.
          When setting as a slot use this format,
          with brackets and a hyphen,
          even if the user didnt type it that way.'
domain.yml
slots:
  phone_number:
    type: text
responses:
  utter_ask_phone_number:
    text: "What is the new phone number?"
```

In another example, validating a slot value's format with a condition is described. A rejections field is added to the collect step to validate the phone number extracted by the Command Generator, and to reject the value if it does not match. This example uses a regular expression, but any condition may be used.

```
flows.yml
flows:
  update_number:
    description: allows users to update the phone
      number associated with their account.
    steps:
      collect: phone_number
        description: 'an entire US phone number,
          including the area code.
          For example: (415) 555-1234.
          When setting as a slot use this format,
          with brackets and a hyphen,
          even if the user didnt type it that way.'
        rejections:
          if: not (slots.phone_number matches "^\[0-9]{3}\)
            [0-9]{3}-[0-9]{4}$")
            utter: utter_invalid_phone_number
```

A corresponding response is added to the domain to inform the user that their phone number wasn't collected successfully:

```
domain.yml
responses:
  ...
  utter_invalid_phone_number:
    text: "Sorry, I didn't get that. Please use the format
      (xxx) xxx-xxxx"
```

In another example, validating a slot value against a database or application programming interface is described. If external data is needed to know if a slot value is valid, the system may use a custom validation action. This example using a custom validation action checks whether there is already another account associated with this phone number. In this custom action, a call to an internal API is made and the code checks whether there is already an account associated with this phone number.

```
actions.py
from typing import Any, Text, Dict, List
from rasa_sdk import Action, Tracker
from rasa_sdk.events import SlotSet
from rasa_sdk.executor import CollectingDispatcher
class ActionCheckPhoneNumberHasAccount(Action):
    def name(self)->Text:
        return "action_check_phone_number_has_account"
    def run(self, dispatcher: CollectingDispatcher,
        tracker: Tracker,
        domain: Dict [Text, Any])->List [Dict [Text, Any]]:
        new_number=tracker.get_slot("phone_number")
        #Mock logic for deciding if a number is available.
        #This is where you would call an API.
        has_account=hash(new_number) % 2==0
        return    [SlotSet("phone_number_has_account",
            has_account)]
```

A boolean slot called phone_number_has_account is added to the domain, along with a response to send in case the phone number is already associated with another account. Also the name of the custom action is added the domain:

```
domain.yml
slots:
  ...
  phone_number_has_account:
    type: bool
``` actions:
    action_check_phone_number_has_account
responses:
    ...
    utter_inform_phone_number_has_account:
        text: "Unfortunately that number is already associated with an account."

A new step is added to the flow to call this custom action. A condition is created in the next field of this step to branch based on the phone_number_has_account slot. If the number already has an account, the AI assistant will inform the user, unset the phone_number slot, and return to the start of the form. In order to jump back to the beginning of the form, add an "id" field to the first step in the flow. The final version of the flow is described as follows:

```
flows.yml
flows:
  update_number:
    description: allows users to update the phone
      number associated with their account.
    steps:
      id: "collect_phone_number"
      collect: phone_number
      description: 'an entire US phone number,
        including the area code.
        For example: (415) 555-1234.
        When setting as a slot use this format,
        with brackets and a hyphen,
        even if the user didnt type it that way.'
      rejections:
        if: not (slots.phone_number matches "^\[0-9]
          {3}) [0-9]{3}-[0-9]{4}$")
        utter: utter_invalid_phone_number
      action:   action_check_phone_number_has_account
      next:
        if: slots.phone_number_has_account
        then:
          action:   utter_inform_phone_number_has_account
          set_slots:
            phone_number: null
          next: "collect_phone_number"
```

Conversation Repair Process

The Conversation Repair process refers to the ability of an AI assistant to handle conversations that deviate from a happy path. The system handles Conversation Repair automatically using a set of customizable patterns. The happy path refers to a conversation where every time the assistant asks the user for information, the user provides an answer which successfully fills the requested slot.

The Conversation Repair process handles or manages conversations or dialogues between the user and the AI assistant which depart from the happy path. For example: (1) the assistant asked for an email address, but the user says something else; (2) the end user interrupts the current flow and switches context to another topic; or (3) the end user changes their mind about something they said earlier. The system provides default or pre-defined patterns for handling each of these exception cases. Each of these patterns are a pre-defined flow. The behavior of the flow may be fully customized by adding a computing process flow with the same name to the AI assistant. In other words, the default pattern may be overridden with a customized flow for the exception.

Some examples of Conversation Repair use cases are described below:

Digressions Use Case. Digressions arise when a user shifts from one flow to another flow. For example, during a money transfer, a user might ask about their current balance. The following dialogue between the user and the AI assistant exemplifies this use case.

User: I want to send some money to Sudarshana
    AI Assistant: How much do you want to send to Sudarshana?
    User: Ah wait, how much money do I have?
    AI Assistant: You currently have 4021.20$ in your account.
    AI Assistant: Let's continue with sending money to Sudarshana.
    AI Assistant: How much money do you want to send to Sudarshana then?
    User: . . .

In this example, the user digresses in the middle of a transfer.

Corrections Use Case. Corrections occur when users modify input data or rectify mistakes. For example, a user might change their mind about the recipient of a transfer. The following dialogue between the user and the AI assistant exemplifies this use case.

User: I want to send some money to Joe
    AI Assistant: How much money do you want to send?
    User: 50$
    AI Assistant: Do you want to send 50$ to Joe? (Yes/No)
    User: Oh wait!! I meant to say to John, not Joe!
    AI Assistant: Updated recipient to John
    AI Assistant: Do you want to send 50$ to John? (Yes/No)
    User: . . .

In this example, the AI assistant is able to determine that a correction is desired by the user to correct the recipient's name from Joe to John.

Cancellations Use Case. A cancellation situation occurs in the dialogue when a user halts a computing process flow mid-conversation. For example, a user opts out of sending money after initiating a transfer of money.

User: I want to send some money to Dimitri
    AI Assistant: How much money do you want to send?
    User: Ah, nevermind. I see I have already sent it earlier.
    AI Assistant: Okay, I am cancelling the transfer.
    User: . . .

In this example, the AI assistant is able to determine that a cancelation of the current or prior request is desired by the user, such as the user canceling a money transfer.

Chitchat Use Case. A chitchat occurs in the dialogue when the user engages in off-topic interactions with the AI assistant without impacting a computing process flow. For example, a user has a casual conversation with the AI Assistant.

User: Hi
    AI Assistant: Hi! I'm your Financial Assistant!
    User: are you an AI Assistant?
    AI Assistant: I'm a virtual assistant made with Rasa.

In this example, the AI assistant is able to determine that the dialogue by the user is of the nature of off-topic interactions. Here the system is able to determine that one or more inputs from the user are not related or are not germane to a current flow.

Completion Use Case. The system may determine that a computing process flow is concluded either by achieving user goals or by user abandonment of dialogue with the AI assistant. For example, a user may query about an account balance.

User: Hey, how much money do I have?

AI Assistant: You currently have 4021.20$ in your account.

AI Assistant: Is there anything else I can help you with?

User: Nothing else.

In this example, the AI assistant is able to determine that the current flow has been completed. In this example, the user input the text "Nothing else" which the AI assistant understand that the user achieved the user goals.

Clarification Use Case. The system may determine that a clarification has arisen or is needed when the user request cannot clearly be identified and where the users input potentially matches multiple different flows. In this example, a user request can be matched to two different flows.

User: cash

AI Assistant: I'm not sure what you'd like to achieve. Do you want to check your balance or transfer money?

In this example, the AI assistant is able to determine that two different flows are related to the user input of the word case. The AI assistant generates additional dialogue with the user to clarify which flow (e.g., a check balance flow or a transfer money flow) should be performed.

Internal Errors Use Case. The system may determine one or more errors arise from unexpected system or flow issues. For example, the system may determine that a system process or service is unresponsive or that an action is unavailable. In this example, a user provides an input, but the system is not able to provide a computing process flow to handle the request.

User: Hey, how much money do I have?

AI Assistant: Sorry, I am having trouble with that. Please try again later.

In this example, the AI assistant provides a predefined response where the AI system has determined that the system is not able to provide a computing process flow to handle the request or where a process or service is unresponsive or unavailable.

Human Handoff Use Case. The system may transfer the dialogue with the AI assistant to another user. For example, when the user requests to be connected to a human agent or when the assistant cannot handle the user's request, the assistant can hand off the conversation. In this example, a user inputs a request to be connected to a human agent.

User: I want to be connected to a human agent.

AI Assistant: I understand you want to be connected to a human agent, but that's something I cannot help you with at the moment. Is there something else I can help you with?

Dialogue Understanding

The system performs the process of dialogue understanding for determining how the user interacting with the AI assistant wants to progress the conversation. In some embodiments, the system uses the Command Generator module to perform dialogue understanding of the inputs received by the system from the user. The Command Generator ingests information about a conversation between the user and the AI assistant, such as a series of textual and/or audio input received via a user interface. This generator outputs a sequence of commands that represent how the user wants to progress the conversation.

For example, if a defined flow is called transfer_money, and a user starts a conversation by saying "I need to transfer some money", the correct command output to initiate the transfer_money flow would be the command StartFlow ("transfer_money").

In another example, if the AI assistant asks the user a yes/no question (using a collect step) and they say "yes.", the correct command output is SetSlot(slot_name, True).

In another example, if the user answers a question, but also requests something new, like "yes. Oh what's my balance?", the command output might be [SetSlot(slot_name, True), StartFlow("check_balance")].

In some embodiments, for the system to interpret the user's message in context, the Command Generator uses: in-context learning, information about the current state of the conversation, and flows defined in for the AI assistant. Descriptions and slot definitions of each flow is included in the prompt as relevant information. However, to scale to a large number of flows, the Command Generator may include only the flows that are relevant to the current state of the conversation.

In some embodiments, the system performs a training process of one or more machine learning models. For example, the ability of the system to retrieve relevant computing process flows has a training component attached to it. During training, the defined computing process flows with flow guards potentially evaluating to true are transformed into documents containing flow descriptions and (optionally) slot descriptions and allowed slot values. These documents are then transformed into vectors using the embedding model and stored in a vector store.

When a user engages in a dialogue with the AI assistant, i.e. during inference, the current conversation context is transformed into a vector and compared against the flows in the vector store. For example, some or all of a portion of received input (e.g., the user dialogue) is provided to an LLM where vector embeddings are generated. The system performs a comparison process between the vector embedding of the user dialogue and of the vector embeddings of the respective descriptions for the computing process flows. This comparison process identifies the computing process flows that are most similar to the current conversation context and includes them into the prompt of the Command Generator.

In some embodiments, however, identified flows may be evaluated by the system to be discarded. For example, additional rules may be applied to select or discard certain flows such as: discard any flow with a computing process flow guard evaluating to False; any flow marked with the always_include_in_prompt property set to true is always included, provided that the flow guard (if defined) evaluates to true; and/or all flows that are active during the current conversation context are always included.

In some embodiments, the system retrieves only relevant flows and includes them in the prompt. The performance of the flow retrieval may depend on the quality of flow descriptions. Good descriptions improve the differentiation among flows covering similar topics, but also boost the alignment between the intended user actions and the flows.

In some embodiments, the system provides a default prompt template. The default prompt template serves as a dynamic framework enabling Command Generator to render prompts. The template consists of a static component, as well as dynamic components that get filled in when rendering a prompt, including:

Current state of the conversation—This part of the template captures the ongoing dialogue.

Defined computing process flows and slots—This part of the template provides the context and structure for the conversation. It outlines the overarching theme, guiding the model's understanding of the conversation's purpose.

Active flow and slot-Active elements within the conversation that require the model's attention.

Flow Commands

In some embodiments, the system provides a set of commands that that the system uses to navigate or manage conversations between an AI assistant and a user. The Command Generator module may generate one or more of the following commands. In some embodiments, the Command Generator module will return a command as described below, and in some instances a command with a specific name of a computing process flow or a slot variable, for example "Start Flow flow_name1", "Cancel Flow flow_name1", "Set Slot slotname1", etc. In some embodiments, the Command Generator module generates a prompt to the LLM and receives command related instructions from the LLM.

Start Flow—Execution of this command by the system starts a new flow.

Cancel Flow—Execution of this command by the system cancels a current flow. This command initiates the Conversation Repair's Cancellation use case.

Set Slot—Execution of this command by the system sets a slot to a given value.

Correct Slots—Execution of this command by the system changes the value of a given slot to a new value. This command initiates the Conversation Repair's Correction use case.

Clarify—Execution of this command by the system asks for clarification. This command initiates the Conversation Repair's Clarification use case.

Chit—Chat Answer-Execution of this command by the system replies a chitchat style free-form answer. This command initiates the Conversation Repair's Chitchat use case.

Knowledge Answer—Execution of the command by the system replies a knowledge-based free-form answer. It works together with the Enterprise Search policy.

Human Handoff—Execution of this command by the system hands off the conversation to a human, such as another user of the system for direct dialogue or conversation.

Error—Execution of this command by the system indicates the AI assistant failed to handle the dialogue due to an internal error.

In some embodiments, the LLM is preconfigured or initialized with a set of commands and instructions about how commands may be selected for use with a computing process flow. For example, a prompt may be generated identifying or describing the available commands that may be used in conjunction with a computing process flow.

Preventing Flows from Starting

In some embodiments, the system provides functionality to prevent flows from starting by the use of flow guards. Flow guards are specified by adding an additional if field to the flow definition. For example, the following flow for showing the user's latest bill can only be triggered if the slots authenticated and email_verified are both true.

flows:
show_latest_bill:
if: "slots.authenticated AND slots.email_verified"
steps:
. . .

If the system determines that the condition after the if key is not met, then the flow would not be started. However, the system may provide exceptions where the flow is triggered through a link step from another flow, or the flow is triggered through a call step from another flow. If a computing process flow should exclusively be started via a link or call step, the flow can be defined with the addition of an "if: False" statement. For example:

flows:
feedback_form:
if: False
steps:
. . .

Figure 4:
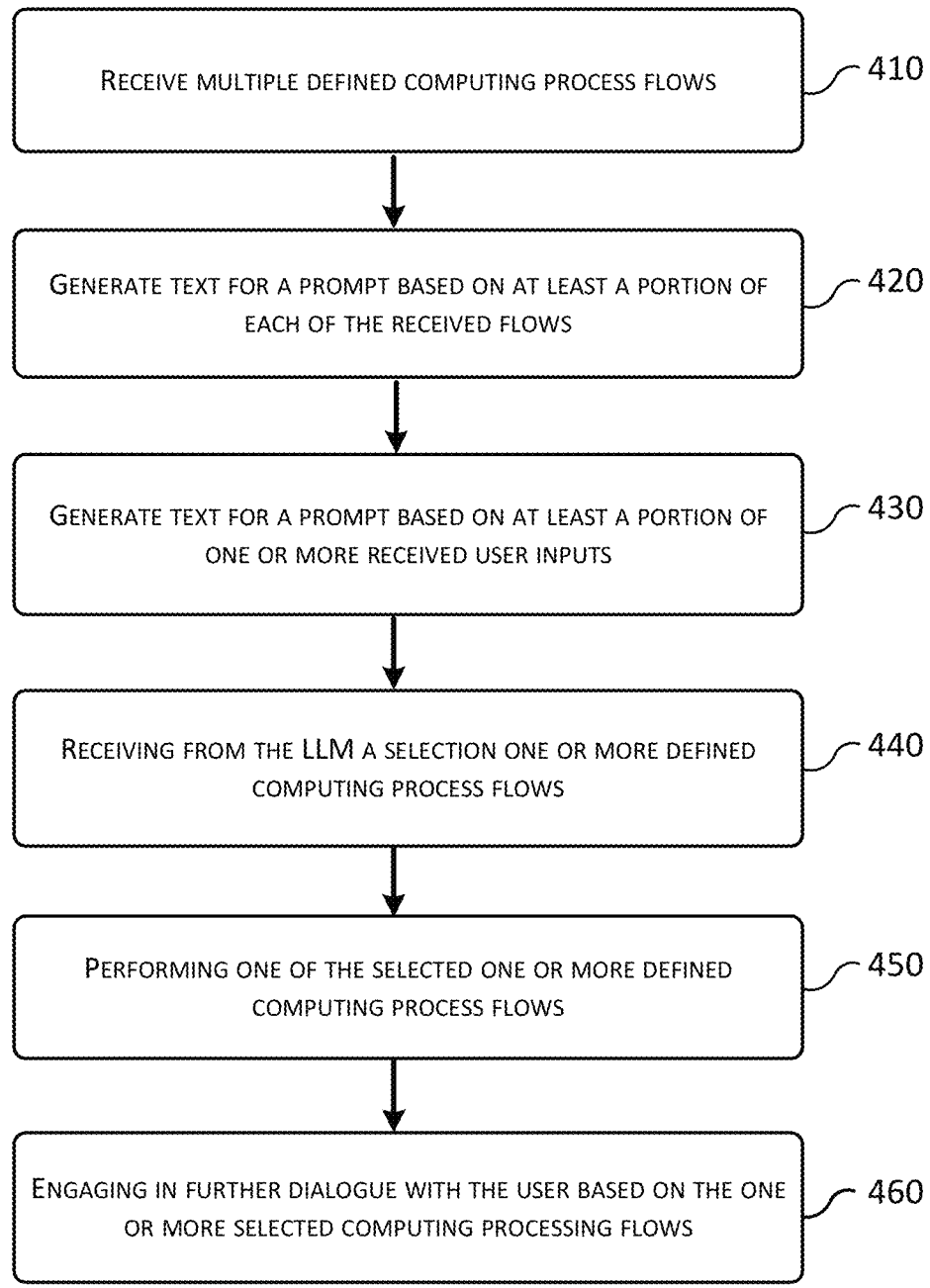
FIG. 4 is a process flow chart illustrating an exemplary method 400 that may be performed in some embodiments.

FIG. 4 is a process flow chart illustrating an exemplary method 400 that may be performed in some embodiments. The process 400 describes the system receiving defined computing process flows and selecting a computing process flow for processing based on the dialogue or conversation that a user is having with an AI assistant. The system uses an LLM to determine context of the dialogue and one or more commands to perform as to a selected computing process flow.

In step 410, the system, via a server, received multiple defined computing process flows. In some embodiments, each of the received defined computing process flows describes one or more instructions to be performed by the defined flow. Also, each of the defined computing process flows includes computing process flow description that uniquely describes the flow.

In step 420, the system generates and provides text for use as a prompt for a large language model (LLM) at least some portions of the text defining the computing process flows. For example, the system may provide the name of a respective computing process flow and a computing process flow description for a respective computing process flow definition. Later this will allow the LLM to select one or more of the computing process flows based on a context and/or dialogue between the user and the AI assistant.

In step 430, the system receives one or more inputs from a user. For example, a user may engage in a conversation with AI assistant, and provide text, graphical image and/or audio signal inputs via a user interface.

In step 430, the system provides as a prompt to the large language model (LLM) at least a portion of the received input from the user. The system, using the LLM, evaluates the received inputs from the user. The system may send individually each received input to the LMM and/or concatenate a series of received inputs. The system generates and provides text for use as a prompt for input to the LLM to determine context of the user inputs. In other words, the LLM determines or understands the dialogue or conversation with the user.

In step 440, the system receives from the LLM one or more selected defined computing process flows that relate to the context of the received input. The system uses the LLM to select one or more processing flows based on the dialogue or conversation that the user has had with the AI assistant. In some embodiments, the LLM may return a listing with a name of each defined computing process flow that is relative or germane to the context of the dialogue or conversation.

In step 450, the system performs one of the selected one or more defined computing process flows. In some embodiments, the system uses the name of the returned list of defined computing processing flows to retrieve from storage or a database the full text or code associated with a computing processing flow. In some embodiments, the LLM also returns a command to perform an operation with respect to the computing processing flow.

In step 460, based on the definition, code, instructions or actions of the selected defined computing process flow, the system engages in additional dialogue or conversation, via the AI assistant, with the user. During the conversation with the user, the AI assistant may perform specific actions or provide specific textual responses to the user according to the computing process flow. Moreover, during the additional dialogue or conversation, the system may generate and provide text for use as a prompt for a large language model (LLM) at least some portions of the additional conversation using new or additional inputs received from the user. Through conversation process between the AI assistant and the user, prompts are continually constructed and provided to the LLM which may determine that a current computing process flow that is being performed should be ceased and/or that a new or different computing processing flow should now be performed based on the dialogue context as determined by the LLM. In other words, the LLM may generate a command to cease the then current computing process flow that is being executed. The LLM may identify one or more new computing processing flows that should now be performed due to the current dialogue context with the user.

Figure 5:
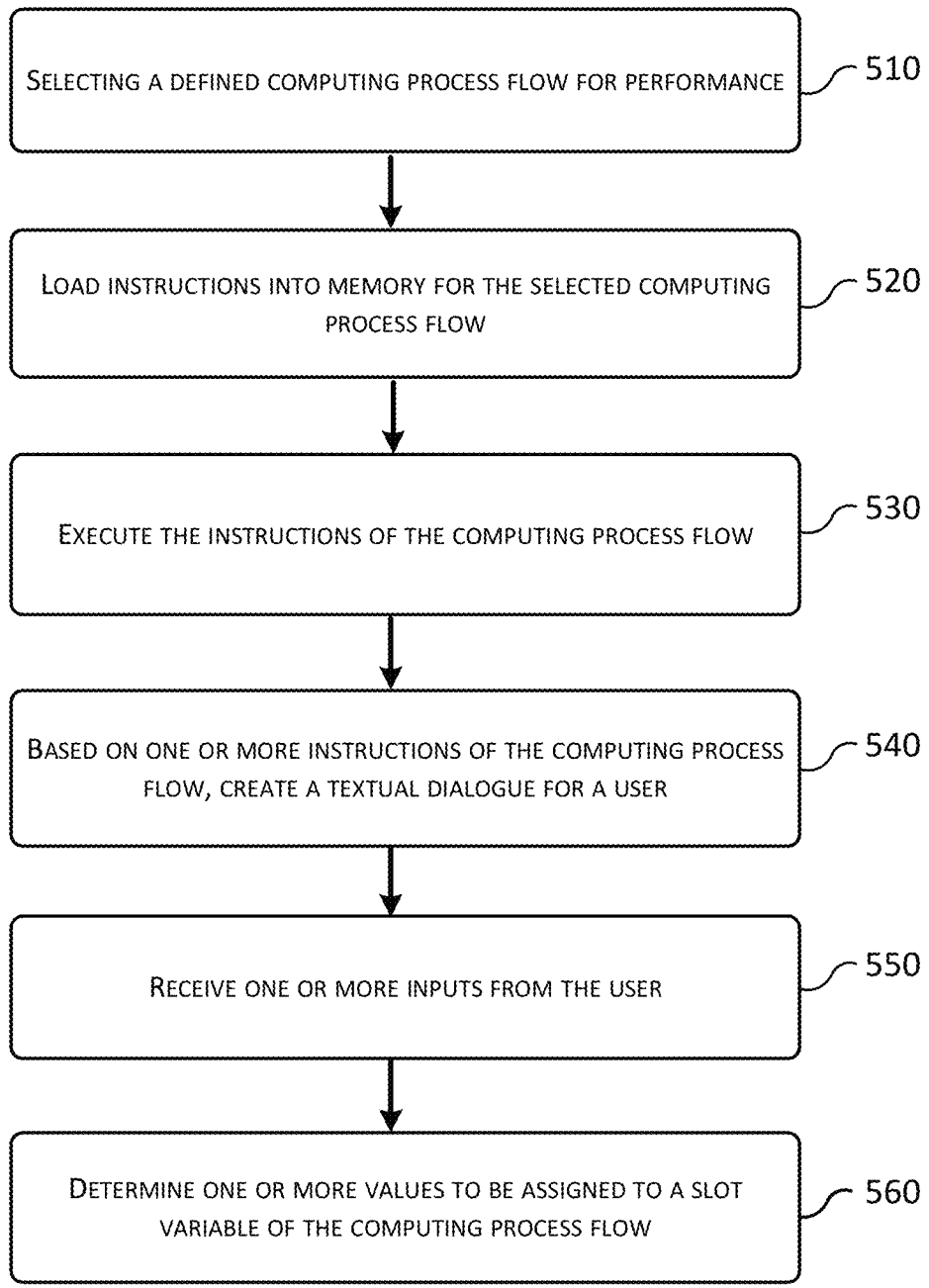
FIG. 5 is a process flow chart illustrating an exemplary method 500 that may be performed in some embodiments.

FIG. 5 is a process flow chart illustrating an exemplary method 500 that may be performed in some embodiments. Process 500 describes the performance by the system of a defined computing process flows.

As described previously, a computing process flow may be selected by an LLM based on a description of the computing process flow and dialogue received as input from a user. Once the computing process flow is selected, the system may then perform the steps of the computing process flow.

In step 510, a defined computing process flow is selected for performance. Multiple computing process flows may be defined, and a computing process flow description is used by the system to select the computing process flow that is germane or relevant to the conversation that the AI assistant is having with a user. In some embodiments, the LLM determines a relevant computing process flow based on conversational dialogue with the user.

In step 520, the system loads or instantiates into memory instructions computing process flow. In some embodiments, the instructions of the computing process flow may be run-time, interpreted code. In some embodiments, the instructions may be precompiled code in a machine executable form and may be preloaded into memory for faster execution or computation by the system.

In step 530, the system executes the steps of the computing process flow. The computing process flow has a series of computation instructions that are to be executed as defined for the selected computing process flow.

In step 540, based on one or more steps of the computing process flow, the system creates textual dialogue for the AI assistant to provide to a user. While the computing process flows can provide any type of computing instructions, typically some of the computing process flows will include some type of computational instructions that would cause text or additional dialogue to be generated. The system would provide this dialogue to the user.

In step 550, the AI assistant will receive one or more inputs, such as textual, audio and/or graphical inputs from a user. Some of the inputs from the user may or may not be germane or relevant to the dialogue created for the user based on the current step of the current computing process flow. The system may generate prompts to be provided to the LLM to determine the context or intent of the user.

In step 560, the system evaluates the received input from the user to determine a value that may be assigned to a slot value as defined in the computing process flow.

In some embodiments, the computing process flow may perform defined actions and/or use application programming interfaces to interact with or access external or third-party systems.

Example Prompt/Instructions to an LLM

The system may generate one or more prompts that instruct the LLM how it should perform with regard to the dialogue or conversational context with the user. For example, the system may instruct the LLM via a prompt that: "Your task is to analyze the current conversation context and generate a list of actions to start new processes that we call flows, to extract slots, or respond to small talk and knowledge requests."

The system may instruct the LLM with a set of available computing processing flows that may be started. For example, via the example code, the system may generate a listing of available flows, their description and related slots:

These are the flows that can be started, with their description and slots:
{% for flow in available_flows %}
{{flow.name}}: {{flow.description}}
   {% for slot in flow.slots-%}
   slot: {{slot.name}} {% if slot.description %} ({{slot.description}}) {% endif %} {% if slot.allowed_values %}, allowed values: {{slot.allowed_values}}
   {% endif %}
   {% endfor %}
{%-endfor %}

The system may instruct the LLM about the specifics of dialogue or conversation with the user. For example, via the example code, the system may provide input to the LLM:

Here is what happened previously in the conversation:
{{current_conversation}}
{% if current_flow!=None %}
You are currently in the flow "{{current_flow}}".
You have just asked the user for the slot "{{current_slot}}" {% if current_slot_description %} ({{current_slot_description}}) {% endif %}.
{% if flow_slots|length>0%}
Here are the slots of the currently active flow:
{% for slot in flow_slots-%}
  name: {{slot.name}}, value: {{slot.value}}, type: {{slot.type}}, description: {{slot.description}} {% if slot.allowed_values %}, allowed values: {{slot.allowed_values}} {% endif %}
{% endfor %}
{% endif %}
{% else %}
   You are currently not in any flow and so there are no active slots.
   This means you can only set a slot if you first start a flow that requires that slot.
   {% endif %}
If you start a flow, first start the flow and then optionally fill that flow's slots with information the user provided in their message.
The user just said """"{{user_message}}"""".

The system may instruct the LLM to generate a list of actions and/or to fill slot values. For example, via the example code, the system instructs to the LLM as to the possible commands to perform with respect to a computing process flow and instructs the LLM how to set a slot value for a defined slot:

Based on this information generate a list of actions you want to take. Your job is to start flows and to fill slots where appropriate. Any logic of what happens afterwards is handled by the flow engine. These are your available actions:

- Slot setting, described by "SetSlot(slot_name, slot_value)". An example would be "SetSlot(recipient, Freddy)"
- Starting another flow, described by "StartFlow(flow_name)". An example would be "StartFlow(transfer_money)"
- Cancelling the current flow, described by "CancelFlow( )"
- Clarifying which flow should be started. An example would be Clarify(list_contacts, add_contact, remove_contact) if the user just wrote "contacts" and there are multiple potential candidates. It also works with a single flow name to confirm you understood correctly, as in Clarify (transfer_money).
- Intercepting and handle user messages with the intent to bypass the current step in the flow, described by "SkipQuestion( )". Examples of user skip phrases are: "Go to the next question", "Ask me something else".
- Responding to knowledge-oriented user messages, described by "SearchAndReply( )"
- Responding to a casual, non-task-oriented user message, described by "ChitChat( )".
- Handing off to a human, in case the user seems frustrated or explicitly asks to speak to one, described by "HumanHandoff( )".

The system may further instruct the LLM as to specific operations. For example, the following instructions may be provided to the LLM:

- Write out the actions you want to take, one per line, in the order they should take place.
- Do not fill slots with abstract values or placeholders.
- Only use information provided by the user.
- Only start a flow if it's completely clear what the user wants. Imagine you were a person reading this message. If it's not 100% clear, clarify the next step.
- Don't be overly confident. Take a conservative approach and clarify before proceeding.
- If the user asks for two things which seem contradictory, clarify before starting a flow.
- If it's not clear whether the user wants to skip the step or to cancel the flow, cancel the flow.
- Strictly adhere to the provided action types listed above.
- Focus on the last message and take it one step at a time.
- Use the previous conversation steps only to aid understanding.

Queue/Stacked Based Flow Processing

In some embodiments, the system will store multiple process flows into memory. For example, a first computing process flow may be initiated. The AI assistant will engage in dialogue with a user. The evaluation of the dialogue indicates that context of the dialogue has changed and that a second computing process flow is now relevant to the current dialogue received from the user. In this situation, the system may now perform the second computing process flow until completion and may then return back to the first computing process flow. Additionally, where the system leaves the first computing process flow, the AI assistant may provide dialogue to the user asking of the actions related to the first computing process flow is still needed.

In some embodiments, during the course of a conversation between the AI assistant and a user, the system will perform many commands to start or stop many different defined computing process flows. Often during the course of dialogue with the user, the context of the user's input will change, and thereby cause the LLM to identify or select a new relevant computing process flow that is different than a currently performed computing process flow. In some embodiments, the system may start a first computing process flow, and then the context of the user input changes. In response, the system may start a second computing process flow. While performing instructions of the second computing process flow, the context of the user input may change yet again, and the LLM determines that another computing processing flow is now relevant or germane to the context of the user dialogue. In response, the system may start a third computing process flow.

In some of these situations, a prior started flow may not have been completed or made final by the system or by the user. The system may keep track of each of the started, but non-completed flows, and provide a dialogue to the user whether a prior flow should be completed. For example, if the third flow is completed, the system may revert back or return to processing of the prior second flow and/or may inquire to the user if the processing related to the second flow is still desired. If the system determines that the user wants to continue with the second flow, then the system would continue to perform the instructions of the second flow. Alternatively, the system, via the LLM, may determine that the second flow should be stopped. In this case, a stop command as to the name second flow would be generated as output by the LLM. The system then would perform the generate stop command for the second flow which ceases performance of further instructions by the second flow. When the second flow is completed or ceases, then the system would again engage with the user and determine if the processing of the first flow is still desired. The system may generate a nodal graph, stack, queue, tree or other construct to keep track and organize the flows that have been started, but not yet completed.

Figure 6:
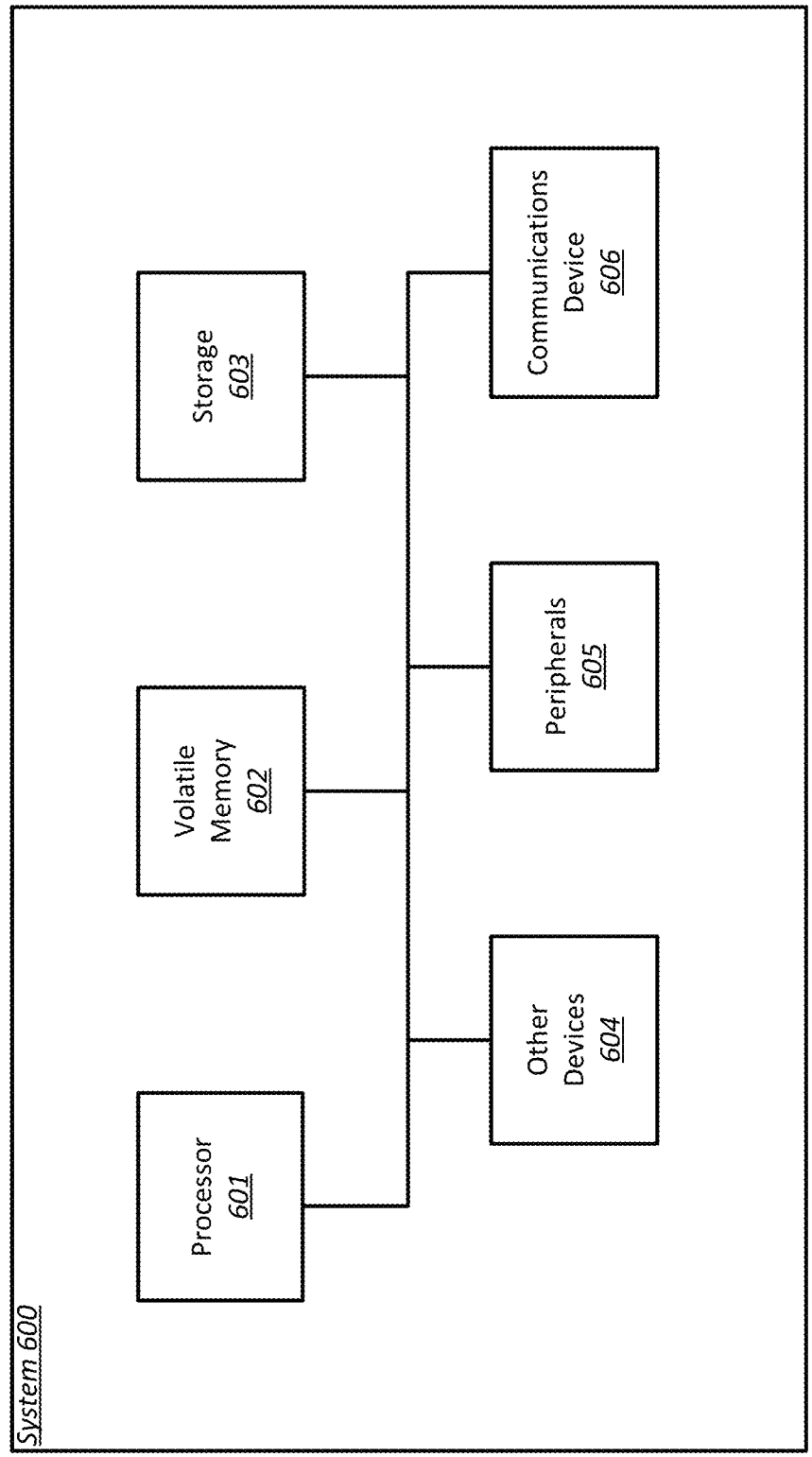
FIG. 6 is a diagram illustrating an exemplary computer that may perform processing in some embodiments.

FIG. 6 is a diagram illustrating an exemplary computer that may perform processing in some embodiments. Exemplary computer 600 may perform operations consistent with some embodiments. The architecture of computer 600 is exemplary. Computers can be implemented in a variety of other ways. A wide variety of computers can be used in accordance with the embodiments herein.

Processor 601 may perform computing functions such as running computer programs. The volatile memory 602 may provide temporary storage of data for the processor 601. RAM is one kind of volatile memory. Volatile memory typically requires power to maintain its stored information. Storage 603 provides computer storage for data, instructions, and/or arbitrary information. Non-volatile memory, which can preserve data even when not powered and including disks and flash memory, is an example of storage. Storage 603 may be organized as a file system, database, or in other ways. Data, instructions, and information may be loaded from storage 603 into volatile memory 602 for processing by the processor 601.

The computer 600 may include peripherals 605. Peripherals 605 may include input peripherals such as a keyboard, mouse, trackball, video camera, microphone, and other input devices. Peripherals 605 may also include output devices such as a display. Communications device 606 may connect the computer 600 to an external medium. For example, communications device 606 may take the form of a network adapter that provides communications to a network. A computer 600 may also include a variety of other devices 604. The various components of the computer 600 may be connected by a connection medium such as a bus, crossbar, or network.

It will be appreciated that the present disclosure may include any one and up to all of the following examples.

Example 1. A computer-implemented method comprising the operations of: receiving multiple defined computing process flows, each defined computing process flow describing one or more instructions to be performed, wherein each defined computing process flow includes a computing process flow description describing the flow; providing as a prompt to a large language model (LLM), at least the name of the flow and a computing process flow description for each of the received multiple defined computing process flows; providing as a prompt to the large language model (LLM) at least a portion of a received input from a user, the received input comprising text and/or an audio signal; receiving from the LLM, a command to perform an operation for a selected defined computing process flow from the multiple defined computing process flows; and performing, by a server, the received command with the selected defined computing process flow.

Example 2. The computer-implemented method of Example 1, wherein performing the selected the received command with the selected defined computing process flow comprises: performing one more computational instructions as described by the selected defined computing process flow.

Example 3. The computer-implemented method of any one of Examples 1-2, further comprising the operations of: determining whether a computing process flow guard applies to a selected flow, and if it does apply, then not performing the selected defined computing process flow.

Example 4. The computer-implemented of any one of Examples 1-3, wherein the method further comprises: performing, by the AI assistant, a conversation repair process to complete or end the selected flow.

Example 5. The computer-implemented of any one of Examples 1-4, wherein the conversation repair process comprises: determining the occurrence of a digression situation in a conversation between the AI assistant and the user, wherein the occurrence of the digression situation is determined where the context of the dialogue of the user shifts from one flow definition to another flow definition.

Example 6. The computer-implemented method of any one of Examples 1-5, wherein the conversation repair process comprises: determining the occurrence of a computing process flow corrections situation in a conversation between the AI assistant and the user, wherein the occurrence of the corrections situation is determined where the context of the dialogue of the user indicates that the user intends to modify or correct a request or query.

Example 7. The computer-implemented method of any one of Examples 1-6, wherein the conversation repair process comprises: determining the occurrence of a computing process flow cancellation situation in a conversation between the AI assistant and the user, wherein the occurrence of the cancellation situation is determined where the context of the dialogue of the user indicates that the user halted a computing process flow mid-conversation.

Example 8. The computer-implemented method of any one of Examples 1-7, wherein the conversation repair process comprises: determining the occurrence of the flow conclusion situation in a conversation between the AI assistant and the user, where the occurrence of the conclusion is determined where the context of the dialogue of the user indicates the user has achieved a user goal or has abandoned dialogue with the AI assistant.

Example 9. The computer-implemented method of any one of Examples 1-8, wherein the flow definition includes a slot definition and the AI assistant identifies a value from the dialogue with the user, and assigning the value for the defined slot.

Example 10. The computer-implemented method of any one of Examples 1-9, further comprising: providing as a prompt to the large language model (LLM) at least a portion of a second received input from the user, the second received input comprising text and/or an audio signal; receiving from the LLM, a second command to perform an operation for the selected defined computing process flow; and performing the second received command on the selected defined computing process flow.

Example 11. The computer-implemented method of any one of Examples 1-10, further comprising: providing as a prompt to the large language model (LLM) at least a portion of a third received input from the user, the third received input comprising text and/or an audio signal; receiving from the LLM, a third command to perform an operation for the a selected new defined computing process flow; and performing the third received command on the selected new defined computing process flow, wherein the selected new defined computing processing flow is different than the selected defined computing process flow.

Example 12. A system comprising one or more processors configured to perform the operation of: receiving multiple defined computing process flows, each defined computing process flow describing one or more instructions to be performed, wherein each defined computing process flow includes a computing process flow description describing the flow; providing as a prompt to a large language model (LLM), at least the name of the flow and a computing process flow description for each of the received multiple defined computing process flows; providing as a prompt to the large language model (LLM) at least a portion of a received input from a user, the received input comprising text and/or an audio signal; receiving from the LLM, a command to perform an operation for a selected defined computing process flow from the multiple defined computing process flows; and performing, by a server, the received command with the selected defined computing process flow.

Example 13. The system of Example 12, wherein performing the selected the received command with the selected defined computing process flow comprises: performing one more computational instructions as described by the selected defined computing process flow.

Example 14. The system of any one of Examples 12-13, further comprising the operations of: determining whether a computing process flow guard applies to a selected flow, and if it does apply, then not performing the selected defined computing process flow.

Example 15. The system of any one of Examples 12-14, wherein the method further comprises performing, by the AI assistant, a conversation repair process to complete or end the selected flow.

Example 16. The system of any one of Examples 12-15, wherein the conversation repair process comprises: determining the occurrence of a digression situation in a conversation between the AI assistant and the user, wherein the occurrence of the digression situation is determined where the context of the dialogue of the user shifts from one flow definition to another flow definition.

Example 17. The system of any one of Examples 12-16, wherein the conversation repair process comprises: determining the occurrence of a computing process flow corrections situation in a conversation between the AI assistant and the user, wherein the occurrence of the corrections situation is determined where the context of the dialogue of the user indicates that the user intends to modify or correct a request or query.

Example 18. The system any one of Examples 12-17, wherein the conversation repair process comprises: determining the occurrence of a computing process flow cancellation situation in a conversation between the AI assistant and the user, wherein the occurrence of the cancellation situation is determined where the context of the dialogue of the user indicates that the user halted a computing process flow mid-conversation.

Example 19. The system any one of Examples 12-18, wherein the conversation repair process comprises: determining the occurrence of the flow conclusion situation in a conversation between the AI assistant and the user, where the occurrence of the conclusion is determined where the context of the dialogue of the user indicates the user has achieved a user goal or has abandoned dialogue with the AI assistant.

Example 20. The system of any one of Examples 12-19, wherein the flow definition includes a slot definition and the AI assistant identifies a value from the dialogue with the user, and assigning the value for the defined slot.

Example 21. The system of any one of Examples 12-20, further comprising: further comprising: providing as a prompt to the large language model (LLM) at least a portion of another received input from the user, the another received input comprising text and/or an audio signal; receiving from the LLM, another command to perform an operation for the selected defined computing process flow; and performing the another received command on the selected defined computing process flows.

Example 22. The system of any one of Examples 12-21, further comprising: providing as a prompt to the large language model (LLM) at least a portion of a third received input from the user, the third received input comprising text and/or an audio signal; receiving from the LLM, a third command to perform an operation for the a selected new defined computing process flow; and performing the third received command on the selected new defined computing process flow, wherein the selected new defined computing processing flow is different than the selected defined computing process flow.

Some portions of the preceding detailed descriptions have been presented in terms of processes, functions and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc. In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method comprising the operations of:
   receiving multiple defined computing process flows, each defined computing process flow describing one or more instructions to be performed, wherein each defined computing process flow includes a computing process flow description describing the flow;
   providing as a prompt to a large language model (LLM), at least a name of a computing process flow and a computing process flow description for each of the received multiple defined computing process flows;
   providing as a prompt to the large language model (LLM) at least a portion of a received input from a user, the received input comprising text and/or an audio signal;

receiving from the LLM, a command to perform an operation for a selected defined computing process flow from the multiple defined computing process flows; and performing, by a server, the received command with the selected defined computing process flow.

2. The computer-implemented method of claim 1, wherein performing the received command with the selected defined computing process flow comprises:

performing one more computational instructions of the selected defined computing process flow.

3. The computer-implemented method of claim 1, further comprising:

determining whether a computing process flow guard applies to a selected defined computing process flow, and if the computing process flow guard does apply, then not performing the selected defined computing process flow.

4. The computer-implemented method of claim 1, wherein the method further comprises:

performing, by an AI assistant, a conversation repair process to complete or end the selected flow.

5. The computer-implemented method of claim 4, wherein the conversation repair process comprises:

determining an occurrence of a digression situation in a conversation between an AI assistant and the user, wherein the occurrence of the digression situation is determined where a context of a dialogue of the user shifts from one flow definition to another flow definition.

6. The computer-implemented method of claim 4, wherein the conversation repair process comprises:

determining an occurrence of a computing process flow corrections situation in a conversation between an AI assistant and the user, wherein the occurrence of the computing process flow corrections situation is determined where a context of a dialogue of the user indicates that the user intends to modify or correct a request or a query.

7. The computer-implemented method of claim 4, wherein the conversation repair process comprises:

determining an occurrence of a computing process flow cancellation situation in a conversation between an AI assistant and the user, wherein the occurrence of the computing process flow cancellation situation is determined where a context of a dialogue of the user indicates that the user halted a computing process flow mid-conversation.

8. The computer-implemented method of claim 4, wherein the conversation repair process comprises:

determining an occurrence of a flow conclusion situation in a conversation between an AI assistant and the user, where the occurrence of the flow conclusion situation is determined where a context of a dialogue of the user indicates the user has achieved a user goal or has abandoned the dialogue.

9. The computer-implemented method of claim 1, wherein a plurality of the multiple defined computing process flows each includes a slot definition and an AI assistant identifies a value from a dialogue with the user and assigns the value to a slot according to a slot definition.

10. The computer-implemented method of claim 1, further comprising the operations of:

providing as a prompt to the large language model (LLM) at least a portion of another received input from the user, the another received input comprising text and/or an audio signal;

receiving from the LLM, another command to perform an operation for the selected defined computing process flow; and performing the another received command with the selected defined computing process flows.

11. A system comprising one or more processors configured to perform the operations of:

receiving multiple defined computing process flows, each defined computing process flow describing one or more instructions to be performed, wherein each defined computing process flow includes a computing process flow description describing the flow;

providing as a prompt to a large language model (LLM), at least a name of a computing process flow and a computing process flow description for each of the received multiple defined computing process flows;

providing as a prompt to the large language model (LLM) at least a portion of a received input from a user, the received input comprising text and/or an audio signal;

receiving from the LLM, a command to perform an operation for a selected defined computing process flow from the multiple defined computing process flows; and performing, by a server, the received command with the selected defined computing process flow.

12. The system of claim 11, wherein performing the received command with the selected defined computing process flow comprises:

performing one more computational instructions of the selected defined computing process flow.

13. The system of claim 11, wherein the one or more processors are further configured to perform the operations of:

determining whether a computing process flow guard applies to a selected defined computing process flow, and if the computing process flow guard does apply, then not performing the selected defined computing process flow.

14. The system of claim 11, wherein the operations further comprise:

performing, by an AI assistant, a conversation repair process to complete or end the selected flow.

15. The system of claim 14, wherein the conversation repair process comprises:

determining an occurrence of a digression situation in a conversation between an AI assistant and the user, wherein the occurrence of the digression situation is determined where a context of a dialogue of the user shifts from one flow definition to another flow definition.

16. The system of claim 14, wherein the conversation repair process comprises:

determining an occurrence of a computing process flow corrections situation in a conversation between an AI assistant and the user, wherein the occurrence of the computing process flow corrections situation is determined where a context of a dialogue of the user indicates that the user intends to modify or correct a request or a query.

17. The system of claim 14, wherein the conversation repair process comprises:

determining an occurrence of a computing process flow cancellation situation in a conversation between an AI assistant and the user, wherein the occurrence of the computing process flow cancellation situation is determined where a context of a dialogue of the user indicates that the user halted a computing process flow mid-conversation.

18. The system of claim 14, wherein the conversation repair process comprises:

determining an occurrence of a flow conclusion situation in a conversation between an AI assistant and the user, where the occurrence of the flow conclusion situation is determined where a context of a dialogue of the user indicates the user has achieved a user goal or has abandoned the dialogue.

19. The system of claim 11, wherein a plurality of the multiple defined computing process flows each includes a slot definition and an AI assistant identifies a value from a dialogue with the user and assigns the value to a slot according to a slot definition.

20. The system of claim 11, wherein the one or more processors are further configured to perform the operations of:

providing as a prompt to the large language model (LLM) at least a portion of another received input from the user, the another received input comprising text and/or an audio signal;

receiving from the LLM, another command to perform an operation for the selected defined computing process flow; and performing the another received command with the selected defined computing process flows.

* * * * *